United States Patent [19]
Steffes

[11] 4,341,076
[45] Jul. 27, 1982

[54] HYDRAULIC BRAKE BOOSTER

[75] Inventor: Helmut Steffes, Eschborn, Fed. Rep. of Germany

[73] Assignee: ITT Industries, Inc., New York, N.Y.

[21] Appl. No.: 144,072

[22] Filed: Apr. 28, 1980

[30] Foreign Application Priority Data

May 2, 1979 [DE] Fed. Rep. of Germany ....... 2917684

[51] Int. Cl.$^3$ ............................................. B60T 13/00
[52] U.S. Cl. ......................... 60/547 R; 60/563; 60/581
[58] Field of Search ............ 60/550, 560, 581, 547 R, 60/563

[56] References Cited

U.S. PATENT DOCUMENTS

| | | | |
|---|---|---|---|
| 3,253,409 | 5/1966 | Kellogg | 60/547 |
| 4,015,881 | 4/1977 | Adachi | 60/581 |
| 4,072,085 | 2/1978 | Soupal | 60/560 |
| 4,244,185 | 1/1981 | Belart | 60/550 |
| 4,244,186 | 1/1981 | Mehren | 60/560 |

FOREIGN PATENT DOCUMENTS 2348857 4/1974 Fed. Rep. of Germany .
2461295 7/1976 Fed. Rep. of Germany .
1345951 2/1974 United Kingdom ................ 60/547

*Primary Examiner*—Abraham Hershkovitz
*Attorney, Agent, or Firm*—John T. O'Halloran; Alfred C. Hill

[57] ABSTRACT

The brake booster comprises a working piston for activation of a master cylinder piston and a transmitting piston having a greater diameter than the working piston in a tandem relationship with the working piston. A transmission pressure chamber is disposed between adjacent ends of the working piston and the transmission piston and a first valve arrangement is provided to load the transmission pressure chamber with pressure fluid or to relieve this chamber of pressure. A drive or actuating pressure chamber is disposed adjacent the other end of the transmission piston and a second valve arrangement is provided to load the drive pressure chamber with pressure fluid or to relieve this chamber of pressure. The first and second valve arrangements are controlled by the brake pedal and constructed in such a way that when the brake pedal is initially operated the brake pedal and the pistons come to a stop until all idle paths have been travelled.

13 Claims, 3 Drawing Figures

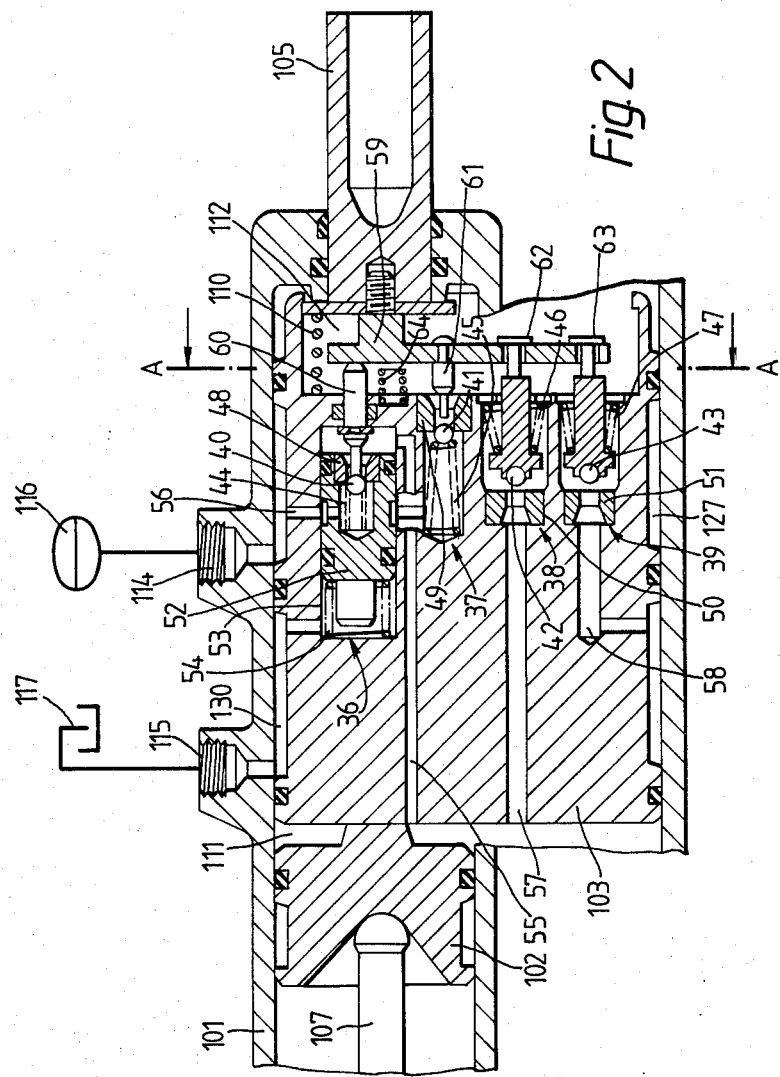
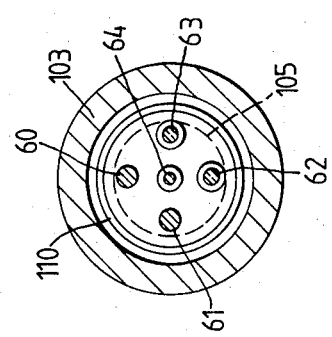

HYDRAULIC BRAKE BOOSTER

BACKGROUND OF THE INVENTION

The present invention relates to a hydraulic brake booster for the production of a brake pressure in a motor vehicle brake system. The brake booster comprises a working piston for driving the master cylinder piston, a transmission piston preferably having a greater diameter than the working piston, a transmission pressure chamber filled with pressure fluid provided between the transmission piston and the working piston, a supply valve arrangement and a return valve arrangement leading to a reservoir associated with the transmission pressure chamber, a drive pressure chamber provided on the other side of the transmission piston, a control piston moveable out of a rest position by a brake pedal and a control valve arrangement disposed adjacent the transmission piston and control piston with an inlet valve and a discharge valve for connection of the drive pressure chamber to a pressure liquid source or a reservoir.

In a known brake booster of this type, such as disclosed in German Patent DE-OS No. 24 61 295, issued July 1, 1976, the transmission pressure chamber is provided to achieve a hydraulic transmission on the basis of different diameters of working piston and transmission piston. The working piston is in one piece connected to the master cylinder piston, or is connected to same via a pressure bar. In the rest position the transmission pressure chamber—just as the master cylinder pressure chamber—is connected to the reservoir via a compensating bore, which after a short stroke is closed and, therefore, serves as a supply—and return valve arrangement.

In a construction of this type the control piston and consequently the brake pedal have to move through a considerable idle path (travel of brake components) before the brakes are applied. This is due to the fact that the clearance at the individual brakes must be overcome and the compensating bores must be covered.

In a brake booster of the above type incorporating a transmission piston, it is already known from German Patent DE-OS No. 23 48 857 to divide the control piston into two parts which are shiftable relatively to one another by a predetermined measure, one of these parts being coupled with the brake pedal and operates the control valve arrangement and the other of these parts is exposed to the pressure in the drive pressure chamber and to a spring which acts opposingly. With this arrangement it is possible to fill, by slightly depressing the brake pedal, the drive pressure chamber sufficiently with pressure fluid and to shift the transmission piston correspondingly such that all idle paths are overcome. Thereby the second control piston part is shifted at the same time until it comes into engagement with the first control piston part. With further operation of the pedal the pressure in the drive pressure chamber increases corresponding to the pedal pressure. A valve with double function is connected into a connecting line between the transmission pressure chamber and the drive pressure chamber. This valve, on one hand, allows a supply of pressure fluid to the transmission pressure chamber and, on the other hand, a discharge of pressure fluid from the transmission pressure chamber if the working piston alone or in addition to the hydraulic pressure, shall be adjusted by the pedal force. Therefore, the opening in the case mentioned above is effected when a relatively high pressure limiting value is exceeded. This construction is especially complicated in the area of the control piston. Furthermore, the transmission piston must move through the total idle path and thus, its stroke must be correspondingly great. Additionally, at least with a greater idle path, the pedal must follow over a part of this idle path.

SUMMARY OF THE INVENTION

An object of the present invention is to provide a hydraulic brake booster of the type mentioned above, in which, after a short initial movement of the brake pedal, the pedal, the control piston and the transmission piston stand still until all idle paths are fully balanced.

A feature of the present invention is the provision of a hydraulic brake booster comprising: a housing having a longitudinal axis; a working piston disposed in the housing coaxial of the axis for driving a master cylinder piston; a transmission piston disposed in the housing coaxial of the axis having one end thereof adjacent the end of the working piston remote from the master cylinder piston, the transmission piston having a diameter greater than the diameter of the working piston; a transmission pressure chamber disposed in the housing between the working piston and the transmission piston, the transmission pressure chamber being filled with a pressure fluid; a drive pressure chamber disposed in the housing adjacent the other end of the transmission piston; a control piston disposed in the housing adjacent the other end of the transmission piston operable from a rest position by a brake pedal; a control valve arrangement disposed in the transmission piston controllable by the control piston, the control valve arrangement having an inlet valve to connect the drive pressure chamber to a pressure fluid source and a discharge valve to connect the drive pressure chamber to a reservoir; a supply valve arrangement associated with the fluid source and the transmission pressure chamber, the supply valve arrangement opening to couple pressurized fluid from the fluid source to the transmission pressure chamber when the control piston is moved from the rest position and the supply valve arrangement closing when pressure in the transmission pressure chamber exceeds a limiting value which corresponds approximately to the lower limit of an active braking pressure; and a return valve arrangement to connect the transmission pressure chamber to the reservoir.

In the brake booster of the present invention the transmission pressure chamber is, following a short movement of the brake pedal, filled with pressure fluid until in the total brake system the braking surfaces lie one against the other and a counter pressure is built up. Only then does the supply valve arrangement close. The pedal travel, which is necessary to achieve this effect, is independent of the idle paths which are existent at the time. The transmission piston remains largely out of action until the supply valve arrangement closes. Therefore, the total stroke of the transmission piston is accordingly small. Thus, the constructional design is correspondingly simple.

The limiting value at which the supply valve arrangement closes may be chosen according to the conditions in which the booster is employed. Usually the limiting value is selected in such a way that the brake surfaces of the brake system are indeed lying one against the other without any strong pressure forces being built up.

For a motor vehicle with automatic drive, the limiting value should correspond to a brake pressure which is just sufficient for producing a brake torque which can overcome the driving torque which remains when the car is stopped. In this way the motor vehicle can be held in a stopped position, e.g. at a traffic light, by slight tapping of the pedal.

The return valve arrangement is preferably formed by a discharge valve to be operated by the control piston and a return valve in a connecting line between the transmission pressure chamber and the drive pressure chamber which is closed during a braking operation with a hydraulic boost. In this way the idle path is eliminated through which the transmission piston has to move for closing the compensating bore. Therefore, the transmission piston can keep its rest position completely unchanged until the real brake process starts.

The supply valve arrangement is formed by the inlet valve of the control valve arrangement and a locking valve arranged in a connecting line between the drive pressure chamber and the transmission pressure chamber. The locking valve is usually open and closes when the limiting pressure in the transmission pressure chamber is reached. When the inlet valve is part of the supply valve arrangement only a locking valve in an additional connecting line is necessary. This results in a very simple construction.

The simple construction is further enhanced when the locking valve is also utilized as the return valve of the return valve arrangement.

Another feature of the present invention is the provision of the supply valve arrangement having a control element and a following element which, when there is a relative movement therebetween, open a passage. The control element can be shifted with the initial movement of the control piston relative to the following element and the following element is part of a piston which in the shifting direction of the control element is loaded by the pressure in the transmission pressure chamber and in the opposite direction by a spring prestressed according to the limiting pressure. In this construction as well only one additional valve is necessary. It is unnecessary to guide the pressure fluid via the drive pressure chamber into the transmission pressure chamber.

An especially simple construction is achieved when the control element and the following element are arranged in the transmission piston and the axes of these elements are arranged parallel to the axis of the transmission piston.

Furthermore, it is advantageous when the control element is provided by a valve poppet and the following element is provided by the seat of a seat valve. A seat valve closes more tightly than a slide valve and also requires lower production costs.

Appropriately the idle path of the control piston is, until the supply valve arrangement opens, smaller than the idle path of the control piston until the inlet valve of the control valve arrangement opens. This results in clearly separated positions of the control piston for overcoming the idle paths and for the actual braking process.

A further advantage is achieved when a pressure point spring is provided between the control piston and the transmission piston, and the pressure point spring is loaded for the supply valve arrangement after having moved through the idle path, but which is loaded for the inlet valve before moving through the idle path.

When utilizing the supply valve arrangement described immediately above it is recommended that the return valve be a non-return valve loaded by a spring, which opens when the pressure in the transmission pressure chamber exceeds the pressure in the drive pressure chamber by a predetermined value. This return valve separates the transmission pressure chamber and the drive pressure chamber during the brake operation with a hydraulic boosting, but connects both pressure chambers during the releasing of the brake. Additionally the return valve allows, in case of failure of the pressure fluid source, the braking force to be mechanically transmitted from the pedal via the transmission piston to the working piston with the pressure fluid being exhausted from the transmission pressure chamber. This is desirable when the acting cross-section of the transmission piston is greater than the acting cross-section of the working piston. The return valve also operates as a non-return valve and can be designed as as seat valve operated mechanically in the transmission piston.

In another embodiment of the present invention the supply valve arrangement, the inlet valve, the return valve arrangement and the discharge valve arrangement all include seat valves and are arranged in the transmission piston. All of the seat valves are coupled non-positively with a traverse wall operated by the control piston until the closed position is reached. This measure results in the valves and connecting channels being provided only in the transmission piston and not in the control piston. This simplifies the brake booster construction and the overall length of the brake booster is kept short.

In order to save space it is advantageous to have all four seat valves arranged concentric to the control piston axis. This arrangement causes no difficulties especially when the transmission piston serves at the same time as a differentiating piston and has a correspondingly great diameter.

BRIEF DESCRIPTION OF THE DRAWING

Above-mentioned and other features and objects of this invention will become more apparent by reference to the following description taken in conjunction with the accompanying drawing, in which:

FIG. 2 is a schematic longitudinal cross-sectional view of a second embodiment of a brake booster in accordance with the principles of the present invention wherein the valve arrangements are shown in a developed view; and FIG. 3 is a transverse cross-sectional view taken along line A—A of FIG. 2 without a developed view.

DESCRIPTION OF THE PREFERRED EMBODIMENTS

Figure 1:
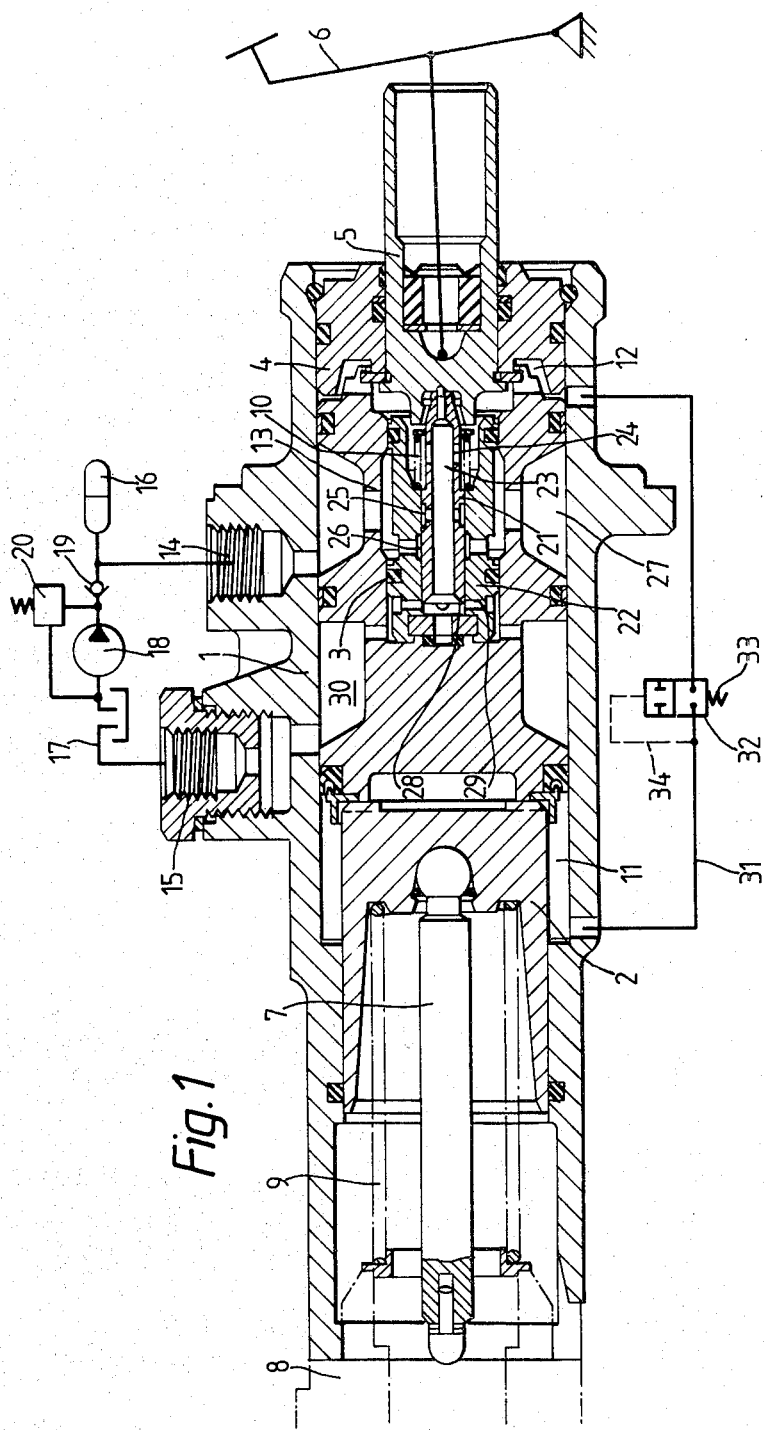
FIG. 1 is a longitudinal cross-sectional view of a first embodiment of a brake booster in accordance with the principles of the present invention.

Referring to FIG. 1 the first embodiment of the brake booster of the present invention includes a housing 1 containing therein a working piston 2 and a transmission piston 3 arranged one behind the other, and a transverse wall 4 containing therein a control piston 5 operated by a brake pedal 6. Working piston 2 acts via a pressure bar 7 on a piston (not shown) in a master cylinder 8 illustrated by dotted lines. The piston of master cylinder 8 displaces in the usual way pressure fluid during the braking process via corresponding pipes into the brake cylinders of the individual brakes of a motor vehicle. A readjusting spring 9 biases working piston 2 and consequently transmission piston 3 into the rest position illustrated. Due to the intermediate spring 10 control piston 5 is also biased into the rest position when pedal 6 is not operated.

Between working piston 2 and transmission piston 3 there is disposed a transmission pressure chamber 11 which is filled with pressure fluid. A shifting of transmission piston 3 to the left leads to a stronger shifting of working piston 2 since working piston 2 has a smaller diameter than transmission piston 3. On the opposite end of transmission piston 3 there is disposed a drive pressure chamber 12 which via a control valve arrangement 13 can alternatively be connected to a connection 14 or a connection 15. Connection 14 is connected to a pressure reservoir 16 and connection 15 is connected to the reservoir 17. A pump 18 fills reservoir 16 via a non-return valve 19, wherein an overpressure valve 20 determines the pressure of reservoir 17.

Control valve arrangement 13 includes a slide valve which has a slider 21 connected to control piston 5 and a sliding sleeve valve 22 which can be moved by transmission piston 3. A bore 23 of slider 21 is connected to drive pressure chamber 12 via radial openings 24. An annular groove 25 connected to interior bore 23 forms together with an annular groove 26 in sleeve 22 an inlet valve which via a circumferential groove 27 is connected to connection 14. The front edge 28 of slider 21 forms together with radial bores 29 a discharge valve which is connected to connection 15 via a circumferential groove 30.

Drive pressure chamber 12 is connected to transmission pressure chamber 11 via a connecting line 31 containing therein a locking valve 32. On the one hand, locking valve 32 is loaded by a spring and, on the other hand, valve 32 is loaded by the pressure in transmission pressure chamber 11 via the filling line 34. Valve 32 locks when this pressure exceeds a limiting value of 2-4 bars.

The operation of the brake booster of FIG. 1 is as follows. When pedal 6 is depressed to the left as viewed in the drawing sufficiently inlet valve 25, 26 opens and discharge valve 28, 29 closes. This permits the pressure fluid out of reservoir 16 to reach drive pressure chamber 12 and transmission pressure chamber 11 via the opened locking valve 32. Since transmission piston 3 has the same pressure applied to both ends piston 3 does not move. Working piston 2, however, moves to the left as viewed in the drawing so that all idle paths in the hydraulic brake systems are overcome. As soon as the braking surfaces at the wheels are in contact the pressure in transmission pressure chamber 11 increases and locking valve 32 closes. Now a higher pressure can develop in drive pressure chamber 12 which shifts transmission piston 3 to the left whereby working piston 2 at a higher speed moves to the left. At the same time inlet valve 25, 26 is closed if pedal 6 is not further depressed. This process is effected against a reaction force determined by the pressure in drive pressure chamber 12. If pedal 6 is kept in a certain position inlet valve 25, 26 closes. Drive pressure chamber 12 is closed to the outside and maintains the given brake pressure. When brake pedal 6 is released, discharge valve 28, 29 opens under the influence of intermediate spring 10. Transmission piston 3 and working piston 2 move to the right the pressure in transmission pressure chamber 11 drops. As soon as this pressure has dropped below the limiting value of 2-4 bars locking valve 32 which now serves as return valve opens and all parts can again take their illustrated rest position. In the embodiment of the brake booster illustrated in FIGS. 2 and 3 reference characters raised by 100 are used for parts identical to the parts of FIG. 1.

The transmission piston 103 of FIGS. 2 and 3 has four seat valves arranged therein, i.e. a supply valve arrangement 36, an inlet valve 37, a return valve 38 and a discharge valve 39. All valve poppets 40, 41, 42 and 43 are loaded by a spring 44, 45, 46 and 47, respectively, and work together with valve seats 48, 49, 50 and 51. The three valve seats 49, 50 and 51 are rigidly fixed in transmission piston 103. The valve seat 48 is fixed in a piston 52 which is shiftable in a bore 53 of transmission piston 103 and loaded by a spring 54 which produces a prestressing corresponding to 2-4 bars. Supply valve arrangement 36 controls a channel 55 between the circumferential groove 127 communicating with inlet port 114 and transmission pressure chamber 111. Inlet valve 37 controls a connection 56 between circumferential groove 127 and drive pressure chamber 112. Return valve 39 controls a connection 57 between transmission pressure chamber 111 and drive pressure chamber 112. Discharge valve 39 controls a line 58 between drive pressure chamber 112 and annular groove 130 in communication with discharge port 115.

A traverse wall 59 is fixed to control piston 105. Traverse wall 59 operates, following a small idle path, a plunger 60 for the purpose of opening supply valve arrangement 36. Following a further idle path wall 59 opens inlet valve 37 by a plunger 61 fixed to wall 59. Movement of traverse wall 59 toward piston 103 enables return valve 38 and discharge valve 39 to close before valve arrangement 36 and valve 37 open due to the holding devices 62 and 63 for valves 38 and 39 extending through and being guided in traverse wall 59. After traverse wall 59 has opened valve 36, but before inlet valve 37 has been opened, traverse wall 59 contacts a pressure point spring 64. Pressure point spring 64 is approximately centrally arranged. The individual valves are disposed around the center of control piston 105 as illustrated in FIG. 3.

This embodiment of the brake booster of the present invention operates as follows. When control piston 105 is slightly shifted to the left return valve 38 and discharge valve 39 are closed and the valve poppet 40 of supply valve arrangement 36 serving as control element rises from valve seat 48. Pressure fluid streams into transmission pressure chamber 111 via channel 56. This results in working piston 102 being shifted to the left whereas transmission piston 103 remains in place. As soon as the braking surfaces of the wheels lie one against the other and the pressure in transmission pressure chamber 111 increases, this pressure acts on the right front surface of piston 52 serving as a following element. Piston 52 moves to the left against the force of prestressed spring 54 until seat valve 36 is closed again. When control piston 105 is shifted further to the left, wherein the force of pressure point spring 64 must be overcome, inlet valve 37 opens. Now drive pressure chamber 112 is filled with pressure fluid whereupon transmission pressure piston 103 moves to the left and drives working piston 102 to the left via the head of pressure fluid included in transmission pressure chamber 111. When the movement of control piston 105 is finished all valves are closed so that a corresponding braking effect is produced. When control piston 105 is no longer operated by the brake pedal, return and discharge valves 38 and 39 open and pistons 102, 103 and 54 again take their rest position under the influence of the corresponding readjusting springs.

Should the pressure reservoir 116 fail, working piston 102 can be mechanically shifted by operation of the pedal, since pistons 102 and 103 abut one another.

While I have described above the principles of my invention in connection with specific apparatus it is to be clearly understood that this description is made only by way of example and not as a limitation to the scope of my invention as set forth in the objects thereof and in the accompanying claims.

I claim:

1. A hydraulic brake booster comprising:
a housing having a longitudinal axis;
a working piston disposed in said housing coaxial of said axis for driving a master cylinder piston;
a transmission piston disposed in said housing coaxial of said axis having one end thereof adjacent the end of said working piston remote from said master cylinder piston, said transmission piston having a diameter greater than the diameter of said working piston;
a transmission pressure chamber disposed in said housing between said working piston and said transmission piston, said transmission pressure chamber being filled with a pressure fluid;
a drive pressure chamber disposed in said housing adjacent the other end of said transmission piston;
a control piston disposed in said housing adjacent said other end of said transmission piston operable from a rest position by a brake pedal;
a control valve arrangement disposed in said transmission piston controllable by said control piston, said control valve arrangement having an inlet valve to connect said drive pressure chamber to a pressure fluid source and a discharge valve to connect said drive pressure chamber to a reservoir;
a supply valve arrangement associated with said fluid source and said transmission pressure chamber, said supply valve arrangement opening to couple pressurized fluid from said fluid source to said transmission pressure chamber when said control piston is moved from said rest position and said supply valve arrangement closing when pressure in said transmission pressure chamber exceeds a limiting value which corresponds approximately to the lower limit of an active braking pressure; and
a return valve arrangement to connect said transmission pressure chamber to said reservoir.

2. A brake booster according to claim 1, wherein said return valve arrangement includes
said discharge valve, and
a return valve disposed in a connecting line between said transmission pressure chamber and said drive pressure chamber.

3. A brake booster according to claim 2, wherein said return valve includes
a locking valve disposed in said connecting line.

4. A brake booster according to claim 3, wherein said supply valve arrangement includes
said inlet valve, and
said locking valve, said locking valve being normally open and closes when said limiting value is reached.

5. A brake booster according to claim 2, wherein said supply valve arrangement includes
a control element coupled to said control piston, and
a follower element capable of relative movement with respect to said control element to open a passage between said fluid source and said transmission pressure chamber,
said control element being shifted relative to said follower element upon initial movement of said control piston, and
said follower element is a part of a piston having one end thereof adjacent said control piston loaded by pressure in said transmission pressure chamber and the other end thereof loaded by a spring prestressed to correspond to said limiting value.

6. A brake booster according to claim 5, wherein said control element and said follower element are disposed in said transmission piston and said control element and said follower element have a common axis that is parallel to said longitudinal axis.

7. A brake booster according to claim 6, wherein said control element is a valve poppet of a seat valve, and
said follower element is a valve seat of said seat valve.

8. A brake booster according to claims 5, 6 or 7, wherein
said control piston has a first idle path prior to opening said supply valve arrangement and a second idle path prior to opening said inlet valve which is larger than said first idle path.

9. A brake booster according to claim 8, further including
a pressure point spring disposed between said control piston and said transmission piston which is loaded after said control piston has moved through said first idle path but before said control piston starts through said second idle path.

10. A brake booster according to claims 2 or 5, wherein
said return valve is a check valve loaded by a spring, said check valve opening when the pressure in said transmission pressure chamber exceeds the pressure in said drive pressure chamber by a predetermined value.

11. A brake booster according to claim 10, wherein said check valve is a mechanically operated seat valve disposed in said transmission piston.

12. A brake booster according to claim 2, wherein said supply valve arrangement includes a seat valve and said return valve, said inlet valve and said discharge valve are all seat valves, said four seat valves being disposed in said transmission piston, and
further including
a traverse wall fixed to said control piston to operate each of said four seat valves in response to movement of said control piston.

13. A brake booster according to claim 12, wherein said four seat valves are disposed in a circle within said transmission piston concentric to said longitudinal axis.

* * * * *